United States Patent
Shioiri et al.

(10) Patent No.: US 7,288,043 B2
(45) Date of Patent: Oct. 30, 2007

(54) BELT TYPE CONTINUOUSLY VARIABLE TRANSMISSION

(75) Inventors: Hiroyuki Shioiri, Susono (JP); Ryuji Ibaraki, Susono (JP); Hitoshi Nomasa, Sunto-gun (JP); Hiroaki Kimura, Susono (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 138 days.

(21) Appl. No.: 11/099,598

(22) Filed: Apr. 6, 2005

(65) Prior Publication Data

US 2005/0250606 A1    Nov. 10, 2005

(30) Foreign Application Priority Data

May 6, 2004    (JP) .............................. 2004-137843

(51) Int. Cl.
*F16H 37/02*    (2006.01)

(52) U.S. Cl. ...................... 475/210; 192/208

(58) Field of Classification Search ............... 475/210; 192/208; 474/12, 16, 17, 18, 19, 21, 23, 474/28; 464/28, 180
See application file for complete search history.

(56) References Cited

U.S. PATENT DOCUMENTS

| | | | | |
|---|---|---|---|---|
| 3,052,132 A | * | 9/1962 | Erhardt et al. | 474/18 |
| 4,348,197 A | * | 9/1982 | Oliver | 474/28 |
| 4,496,335 A | * | 1/1985 | Quick et al. | 474/15 |
| 4,633,736 A | * | 1/1987 | Sakakibara et al. | 475/52 |
| 5,080,639 A | * | 1/1992 | Sakakibara et al. | 475/211 |
| 5,292,290 A | * | 3/1994 | Scholz et al. | 475/231 |
| 6,306,059 B1 | | 10/2001 | Yamada | |
| 6,561,934 B2 | | 5/2003 | Kashiwase | |

FOREIGN PATENT DOCUMENTS

| | | |
|---|---|---|
| DE | 34 15 773 A1 | 10/1985 |
| DE | 43 27 435 A1 | 3/1994 |
| DE | 103 31 559 A1 | 2/2004 |
| GB | 2 180 021 A | 3/1987 |
| JP | 60026843 A | 2/1985 |
| JP | 64-12960 | 1/1989 |
| JP | 2000266154 A | 9/2000 |
| JP | 2001-227615 | 8/2001 |
| JP | 2004360736 A * | 12/2004 |

* cited by examiner

*Primary Examiner*—David D. Le
(74) *Attorney, Agent, or Firm*—Oblon, Spivak, McClelland, Maier & Neustadt, P.C.

(57) ABSTRACT

A belt type continuously variable transmission including a primary pulley; a secondary pulley; a belt which is looped over the primary pulley and the secondary pulley; a reduction gear unit that transmits torque, which has been output from an internal combustion engine and then transmitted to a secondary shaft, to a final reduction gear unit that is provided so as to be coaxial with the secondary shaft of the secondary pulley; and a damper oil chamber which is provided between the secondary shaft and an input shaft of the reduction gear unit. A thrust force generated in the reduction gear unit due to an input of a driving force is transmitted to a hydraulic fluid in a damper oil chamber, and then absorbed. Therefore, a displacement of a relative position between the primary pulley and the secondary pulley is suppressed.

17 Claims, 8 Drawing Sheets

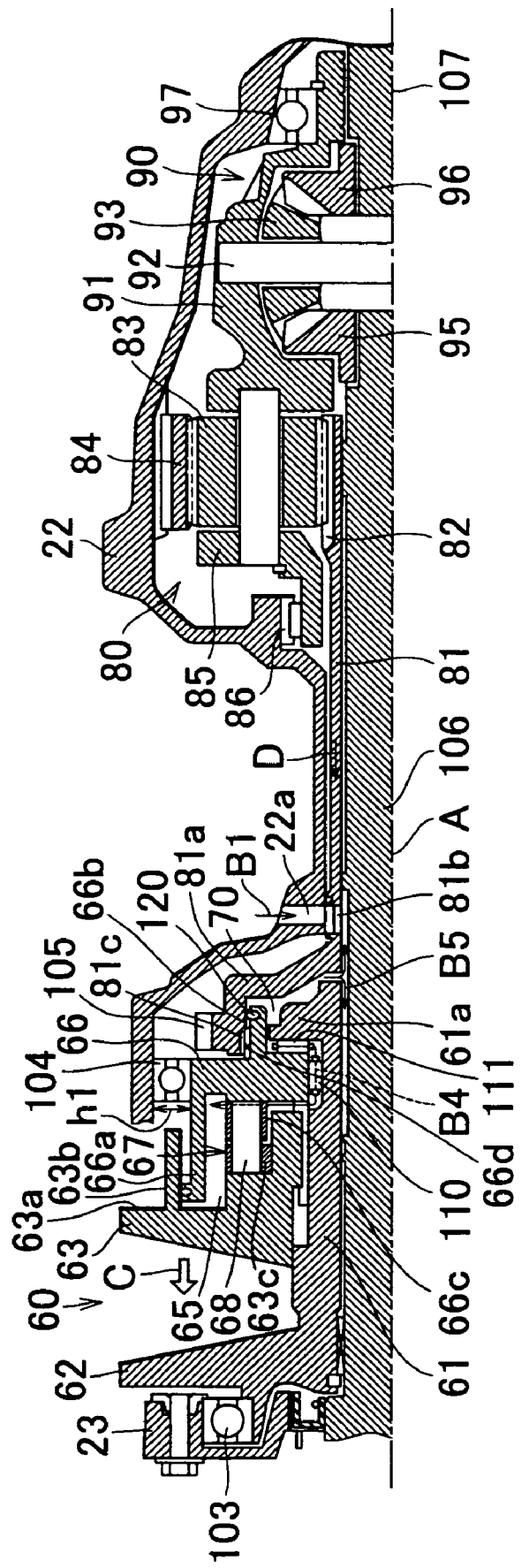

BELT TYPE CONTINUOUSLY VARIABLE TRANSMISSION

INCORPORATION BY REFERENCE

The disclosure of Japanese Patent Application No. 2004-137843 filed on May 6, 2004 including the specification, drawings and abstract is incorporated herein by reference in its entirety.

BACKGROUND OF THE INVENTION

1. Field of the Invention

The invention relates to a belt type continuously variable transmission. More particularly, the invention relates to a belt type continuously variable transmission provided with a planetary gear set which is coaxial with an output side pulley shaft of an output side pulley of the belt type continuously variable transmission, and which is also coaxial with a differential gear unit.

2. Description of the Related Art

Generally, a vehicle includes a transmission on an output side of a drive source such that a driving force transmitted from drive source such as an internal combustion engine and an electric motor, that is, torque output from the drive source is transmitted to wheels in the optimum condition based on a running state of the vehicle. There are two types of transmissions, that are, a continuously variable transmission which continuously controls a speed ratio, and a stepped transmission which controls a speed ratio in a stepwise manner. An example of a continuously variable transmission is a belt type continuously variable transmission which includes a primary pulley that is an input side pulley, a secondary pulley that is an output side pulley, and a belt. The primary pulley includes an input side pulley shaft, a movable sheave which slides on the pulley shaft in the axial direction, a fixed sheave which faces the movable sheave in the axial direction such that a V-shaped groove is formed between the fixed sheave and the movable shave, and belt holding force generating means for generating a belt holding force at a position between the movable sheave and the fixed sheave. The secondary pulley includes an output side pulley shaft, a movable sheave which slides on the pulley shaft in the axial direction, a fixed sheave which faces the movable sheave in the axial direction such that a V-shaped groove is formed between the fixed sheave and the movable shave, and belt holding force generating means for generating a belt holding force at a position between the movable sheave and the fixed sheave. The input side pulley shaft and the output side pulley shaft are provided so as to be parallel to each other. The belt is looped over the V-shaped grooves formed in the primary pulley and the secondary pulley.

In the belt type continuously variable transmission, each movable sheave is slid on the pulley shaft in the axial direction by the corresponding belt holding force generating means, whereby a width of the V-shaped groove formed in each of the primary pulley and the secondary pulley is changed. Thus, a radius of a portion where the belt and each of the primary pulley and the secondary pulley contact each other is continuously changed, and therefore a speed ratio is continuously changed. Namely, torque output from the drive source is continuously changed in the belt type continuously variable transmission.

The torque, which has been output from the drive source and then transmitted to the output side pulley shaft of the belt type continuously variable transmission, is finally transmitted to a differential gear unit that is a final reduction device. Then, the torque is transmitted from the differential gear unit to a road surface via wheels, whereby the vehicle runs forward or in reverse. Various methods of arranging the differential gear unit with respect to the secondary pulley are proposed. For example, as disclosed in Japanese Patent Application Publication No. JP(A) 2001-227615, the differential gear unit is provided so as to be coaxial with an output side pulley shaft of a secondary pulley in consideration of the space of the vehicle in which a power transmission device including a belt type continuously variable transmission and a differential gear unit are mounted. In this case, a planetary gear set that is a reduction gear unit, which decreases the rotational speed transmitted from the output side pulley shaft, is provided between the secondary pulley and the differential gear unit. Namely, the planetary gear set is provided so as to be coaxial with the output side pulley shaft of the secondary pulley.

The planetary gear set includes a sun gear, multiple pinions which are meshed with the sun gear and which are provided around the sun gear, and a ring gear which are meshed with the multiple pinions. Since helical gears as these gears are used in order to reduce gear noise, a thrust force is generated in each of the gears in the planetary gear set, when toque output from a drive source is transmitted to the planetary gear set via the output side pulley shaft of the secondary pulley.

In the above-mentioned belt type continuously variable transmission in the related art, the planetary gear set is arranged so as to be coaxial with the output side pulley shaft of the secondary pulley. Therefore, the sun gear is attached to the output side pulley shaft at an end portion on the planetary gear set side, or the sun gear is formed integrally with an input shaft. Therefore, due to the thrust force generated in the sun gear, the output side pulley shaft moves in the axial direction, and therefore the secondary pulley moves in the axial direction. At this time, the primary pulley is also dragged and moved by a belt, which is looped over the primary pulley and the secondary pulley, in a direction in which the secondary pulley moves.

The thrust force is changed according to a change in the torque output from the drive source. Therefore, if the torque output from the drive source changes abruptly, a positional displacement of the output side pulley shaft with respect to the input side pulley shaft in the axial direction may occur instantaneously. Namely, a displacement of a relative position between the primary pulley and the secondary pulley in the axial direction may occur instantaneously.

SUMMARY OF THE INVENTION

The invention is made in light of the above-mentioned circumstances. Accordingly, there is provided a belt type continuously variable transmission in which a displacement of a relative position between an input side pulley and an output side pulley in an axial direction can be suppressed.

Therefore, there is provided a belt type continuously variable transmission including the following elements. The elements are an input side pulley which includes an input side pulley shaft to which a driving force from a drive source is transmitted, an input side movable sheave that slides on the input side pulley shaft in an axial direction of the input side pulley shaft, and an input side fixed sheave that faces the input side movable sheave in the axial direction such that an input side groove is formed between the input side fixed sheave and the input side movable sheave; an output side pulley which includes an output side pulley shaft that is provided in parallel with the input side pulley shaft, an output side movable sheave that slides on the output side pulley shaft in an axial direction of the output side pulley shaft, and an output side fixed sheave that faces the output side movable sheave in the axial direction such that an output side groove is formed between the output side fixed sheave and the output side movable sheave; a belt which is looped over the input side groove and the output side groove; a planetary gear set which transmits the driving force transmitted from the output side pulley to a differential gear unit that is provided so as to be coaxial with the output side pulley shaft; and a damper device which is provided between the output side pulley and the planetary gear set.

With the belt type continuously variable transmission having the above-mentioned structure, when a thrust force generated in the planetary gear set is transmitted to the output side pulley, that is, when a thrust force transmitted to the input shaft is transmitted to the output side pulley shaft, the thrust force is absorbed by the damper device, for example, sliding of the input shaft, that is, a damper oil chamber whose volume changes according to an amount of the thrust force transmitted to the input shaft, whereby the thrust force transmitted to the output side pulley shaft is reduced. Accordingly, even if the thrust force abruptly increases due to a change in the driving force from the drive source, especially, due to an abrupt change in the driving force from the drive source, the thrust force transmitted to the output side pulley shaft is reduced. It is therefore possible to suppress a positional displacement of the output side pulley shaft with respect to the input side pulley shaft in the axial direction.

With the belt type continuously variable transmission according to the invention, it is possible to suppress a positional displacement of the output side pulley shaft in the axial direction when the driving force from the drive source changes. As a result, it is possible to suppress a displacement of a relative position between the input side pulley and the output side pulley in the axial direction.

BRIEF DESCRIPTION OF THE DRAWINGS

The above-mentioned and other features, advantages, technical and industrial significance of this invention will be better understood by reading the following detailed description of preferred embodiments of the invention, when considered in connection with the accompanying drawings, in which:

FIG. 6 is a view for describing an operation of the belt type continuously variable transmission according to the second embodiment;

DETAILED DESCRIPTION OF THE PREFERRED EMBODIMENTS

In the following description and the accompanying drawings, the present invention will be described in more detail with reference to exemplary embodiments. In the following description, as a vehicle in which a belt type continuously variable transmission 1-1 or 1-2 according to the invention is mounted, a FF (front engine front drive) vehicle is used. Also, as a drive source mounted in the vehicle, an internal combustion engine (e.g., a gasoline engine, a diesel engine, and a LPG engine) is used. However, the drive source mounted in the vehicle is not limited to the internal combustion engine. For example, an electric motor may be used as the drive source.

Figure 1:
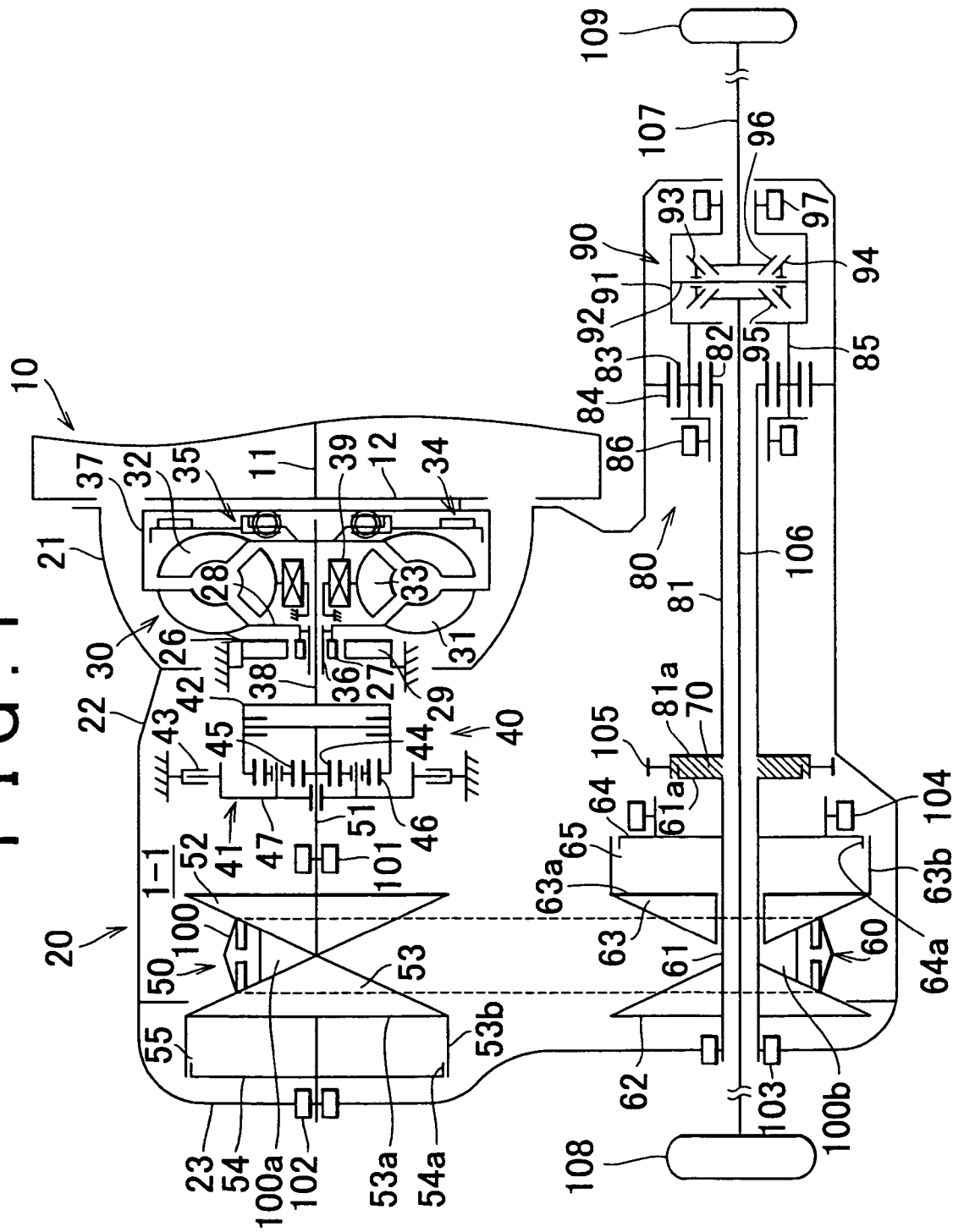
FIG. 1 is a skeleton diagram showing a belt type continuously variable transmission according to a first embodiment of the invention.
Figure 2:
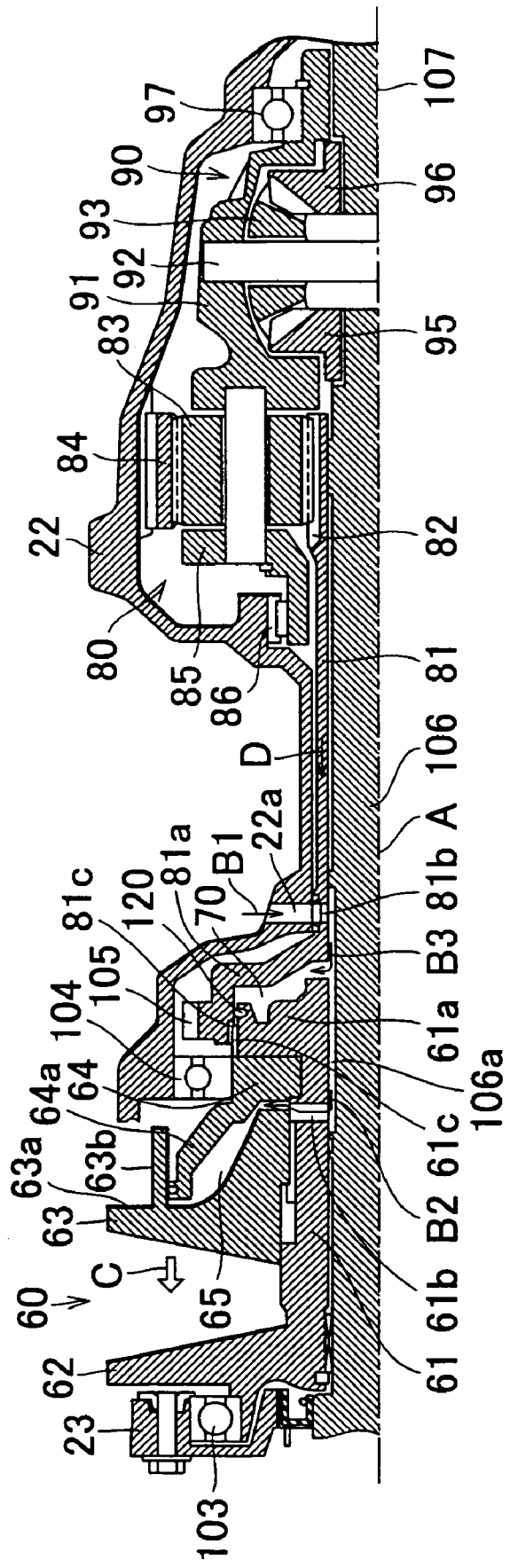
FIG. 2 is a cross sectional view showing a main portion of the belt type continuously variable transmission according to the first embodiment.

Initially, a first embodiment of the invention will be described. FIG. 1 is a skeleton diagram showing a belt type continuously variable transmission according to the first embodiment. FIG. 2 is a cross sectional view showing a main portion of the belt type continuously variable transmission according to the first embodiment. As shown in FIG. 1, a transaxle 20 is provided on the output side of the internal combustion engine 10. The transaxle 20 includes a transaxle housing 21, a transaxle case 22 attached to the transaxle housing 21, a transaxle rear cover 23 attached to the transaxle case 22, and the like.

A torque converter 30 is housed in the transaxle housing 21. A primary pulley 50 that is an input side pulley, a secondary pulley 60 that is an output side pulley, a damper oil chamber 70 that is damper means, a reduction gear that is a planetary gear set, and a belt 100 are housed in a case formed of the transaxle case 22 and the transaxle rear cover 23. Note that a reference numeral "40" signifies a forward/reverse changing mechanism, and a reference numeral "90" signifies a final reduction gear unit that is a differential gear unit.

As shown in FIG. 1, the torque converter 30 that is a take-off mechanism increases a driving force transmitted from the drive source, that is, torque output from the internal combustion engine 10, and then transmits the driving force to the belt type continuously variable transmission 1-1. Alternatively, the torque converter 30 transmits the driving force transmitted from the drive source to the belt type continuously variable transmission 1-1 as it is. The torque converter 30 includes at least a pump impeller 31, a turbine runner 32, a stator 33, a lock-up clutch 34, and a damper device 35.

The pump impeller 31 is attached to a rotatable hollow shaft 36 which is arranged coaxially with a crankshaft 11 of the internal combustion engine 10. Namely, the pump impeller 31 is rotatable around the same axis as that of the crankshaft 11 along with the hollow shaft 36. The pump impeller 31 is connected to a front cover 37. The front cover 37 is coupled with the crankshaft 11 via a drive plate 12 of the internal combustion engine 10.

The turbine runner 32 is provided so as to face the pump impeller 31. The turbine runner 32 is attached to an input shaft 38 which is provided in the hollow shaft 36, and which is rotatable around the same axis as that of the crankshaft 1. Namely, the turbine runner 32 is rotatable around the same axis as that of the crankshaft 11 along with the input shaft 38.

The stator 33 is provided between the pump impeller 31 and the turbine runner 32 via a one-way clutch 39. The one-way clutch 39 is fixed to the transaxle housing 21. The lock-up clutch 34 is provided between the turbine runner 32 and the front cover 37, and the lock-up clutch 34 is coupled with the input shaft 38 via the damper device 35. A hydraulic fluid is supplied, as a working fluid, from a hydraulic fluid supply control device (not shown) to a space formed by the pump impeller 31 and the front cover 37.

An operation of the torque converter 30 will be described. The output toque from the internal combustion engine 10 is transmitted to the front cover 37 via the crankshaft 11 and a drive plate 12. When the lock-up clutch 34 is disengaged by the damper device 35, the torque, which has been output from the internal combustion engine 10 and then transmitted to the front cover 37, is transmitted to the pump impeller 31, and is then transmitted to the turbine runner 32 via the hydraulic fluid circulating between the pump impeller 31 and the turbine runner 32. The torque, which has been output from the internal combustion engine 10 and then transmitted to the turbine runner 32, is transmitted to the input shaft 38. Namely, the torque converter 30 increases the torque output from the internal combustion engine 10, and then transmits the torque to the belt type continuously variable transmission 1-1 via the input shaft 38. In this case, a flow of the hydraulic fluid circulating between the pump impeller 31 and the turbine runner 32 can be changed by the stator 33, whereby a predetermined torque characteristic can be obtained.

On the other hand, when the lock-up clutch 34 is engaged with the front cover 37 by the damper device 35, the torque, which has been output from the internal combustion engine 10 and then transmitted to the front cover 37, is directly transmitted to the input shaft 38 without using the hydraulic fluid. Namely, the torque converter 30 directly transmits the torque output from the internal combustion engine 10 to the belt type continuously variable transmission 1-1 via the input shaft 38.

An oil pump 26 is provided between the torque converter 30 and the forward/reverse changing mechanism 40. The oil pump 26 includes a rotor 27, a hub 28, and a body 29. The oil pump 26 is connected to the pump impeller 31 via the cylindrical hub 28 by the rotor 27. The body 29 is fixed to the transaxle case 22. The hub 28 and the hollow shaft 36 are in splined engagement. Accordingly, the oil pump 26 can operate since the torque output from the internal combustion engine 10 is transmitted to the rotor 27 via the pump impeller 31.

As shown in FIG. 1, the forward/reverse changing mechanism 40 transmits the torque, which has been output from the internal combustion engine 10 and then transmitted to the forward/reverse changing mechanism 40 via the torque converter 30, to the primary pulley 50 of the belt type continuously variable transmission 1-1. The forward/reverse changing mechanism 40 includes at least a changing planetary gear set 41, a forward clutch 42, and a reverse brake 43.

The planetary gear set 41 includes a sun gear 44, pinions 45, and a ring gear 46.

The sun gear 44 and a coupling member (not shown) are in splined engagement. The coupling member and a primary shaft 51 that is an input side pulley shaft of the primary pulley 50 are in splined engagement. Accordingly, the toque, which has been output from the internal combustion engine 10 and then transmitted to the sun gear 44, is transmitted to the primary shaft 51.

The pinions 45 are meshed with the sun gear 44. Multiple (for example, three) pinions 45 are provided around the sun gear 44. Each of the pinions 45 is supported by a carrier 47. The carrier 47 supports the pinions 45 such that the pinions 45 can revolve around the sun gear 44 along with the carrier 47. The carrier 47 is connected to the reverse brake 43 at an outer side end portion thereof.

The ring gear 46 is meshed with the pinions 45 which are supported by the carrier 47. The ring gear 46 is connected to the input shaft 38 of the torque converter 30 via the forward clutch 42.

An engaged/disengaged state of the forward clutch 42 is controlled by the hydraulic fluid supplied from the hydraulic fluid supply control device to a hollow portion (not shown) of the input shaft 38. When the forward clutch 42 is disengaged, the torque, which has been output from the internal combustion engine 10 and then transmitted to the input shaft 38, is transmitted to the ring gear 46. On the other hand, when the forward clutch 42 is engaged, the ring gear 46, the sun gear 44 and the pinions 45 rotate together with each other, instead of rotating with respect to each other. Then, the torque, which has been output from the internal combustion engine 10 and then transmitted to the input shaft 38, is directly transmitted to the sun gear 44.

An applied/released state of the reverse brake 43 is controlled by a brake piston (not shown) to which the hydraulic fluid is supplied from the hydraulic fluid supply control device. When the reverse brake 43 is applied, the carrier 47 is fixed to the transaxle case 22, and the pinions 45 cannot revolve around the sun gear 44. When the reverse brake 43 is released, the carrier 47 is disengaged, and the pinions 45 can revolve around the sun gear 44.

The primary pulley 50 that is the input side pulley of the belt type continuously variable transmission 1-1 transmits the torque, which has been output from the internal combustion engine 10 and then transmitted to the primary pulley 50 via the forward/reverse changing mechanism 40, to the secondary pulley 60 of the belt type continuously variable transmission 1-1 using the belt 100. As shown in FIG. 1, the primary pulley 50 includes the primary shaft 51 that is the input side pulley shaft, an input side fixed sheave 52, an input side movable sheave 53, and an input side oil chamber 55 having a function as speed ratio control means.

The primary shaft 51 is rotatably supported by bearings 101 and 102. The primary shaft 51 is a hollow shaft. A hydraulic fluid that is a working fluid to be supplied to the input side oil chamber 55 flows into a hollow portion (not shown) of the primary shaft 51 through an oil supply port (not shown) formed in the transaxle rear cover 23.

The input side fixed sheave 52 is formed integrally with the outer surface of the primary shaft 51 so as to face the input side movable sheave 53. The input side movable sheave 53 and the primary shaft 51 are in splined engagement such that the input side movable sheave 53 is slidable on the primary shaft 51 in the axial direction. A V-shaped input side groove 100a is formed between the input side fixed sheave 52 and the input side movable sheave 53. More particularly, the V-shaped input side groove 100a is formed between a surface of the input side fixed sheave 52, which faces the input side movable sheave 53, and a surface of the input side movable sheave 53, which faces the input side fixed sheave 52.

The input side oil chamber 55 is formed by a back surface 53a of the input side movable sheave 53, which is on the opposite side of the surface that faces the input side fixed sheave 52, and a disc-like input side partition 54 which is fixed to the primary shaft 51. A ring-shaped protruding portion 53b which protrudes toward the transaxle rear cover 23 is formed on the back surface 53a of the input side movable sheave 53. Meanwhile, a ring-shaped protruding portion 54a which protrudes toward the input side movable sheave 53 is formed on the input side partition 54. Sealing means, for example, an O-ring is provided between the protruding portion 53b and the protruding portion 54a. Namely, sealing is provided between the back surface 53a of the input side movable sheave 53 and the input side partition 54 by the sealing means, the back surface 53a and the input side partition 54 constituting the input side oil chamber 55.

The hydraulic fluid, which has flowed into a hollow portion 51a (not shown) of the primary shaft 51, is supplied to the input side oil chamber 55 from the hydraulic fluid supply control device through an oil passage (not shown). Namely, the hydraulic fluid is supplied to the input side oil chamber 55, and the input side movable sheave 53 is slid in the axial direction by the pressure of the hydraulic fluid supplied to the input side oil chamber 55, whereby the input side movable sheave 53 is moved so as to come closer to/move away from the input side fixed sheave 52. The input side movable sheave 53 generates a pressing force applied toward the input side fixed sheave 52 using the hydraulic fluid supplied to the input side oil chamber 55. Thus, the input side oil chamber 55 serves as speed ratio control means for controlling the speed ratio by controlling the position of the input side movable sheave 53 on the primary shaft 51 in the axial direction.

The secondary pulley 60 that is the output side pulley of the belt type continuously variable transmission 1-1 transmits the torque, which has been output from the internal combustion engine 10 and then transmitted to the secondary pulley 60 by the belt, to the reduction gear unit 80 of the belt type continuously variable transmission 1-1. As shown in FIGS. 1 and 2, the secondary pulley 60 includes a secondary shaft 61 that is an output side pulley shaft; an output side fixed sheave 62; an output side movable sheave 63; and an output side oil chamber 65 having a function as output side belt holding force generating means.

The secondary shaft 61 is rotatably supported by bearings 103 and 104. The secondary shaft 61 is a hollow shaft, and an after-mentioned drive shaft 106 is provided in a hollow portion of the secondary shaft 61. A protruding portion 61a, which protrudes outward in the radial direction of the secondary shaft 61, is formed on the secondary shaft 61 at an end portion on the reduction gear unit 80 side. A spline 61c is formed on an outer surface portion of the protruding portion 61a. An oil passage 106a is formed between the secondary shaft 61 and the drive shaft 106. A hydraulic fluid that is a working fluid to be supplied to the output side oil chamber 65 flows into the oil passage 106a through an oil supply port 22a formed in the transaxle 22, from the hydraulic fluid supply control device, as shown by an arrow B1. Also, a communication hole 61b which permits communication between the oil passage 106a and the output side oil chamber 65 is formed in the secondary shaft 61.

The output side fixed sheave 62 is formed integrally with the outer surface of the secondary shaft 61 so as to face the output side movable sheave 63. The output side movable sheave 63 and the secondary shaft 61 are in splined engagement such that the output side movable sheave 63 is slidable on the secondary shaft 61 in the axial direction. A V-shaped output side groove 100b is formed between the output side fixed sheave 62 and the output side movable sheave 63. More particularly, the V-shaped output side groove is formed between a surface of the output side fixed sheave 62, which faces the output side movable sheave 63, and the surface of the output side movable sheave 63, which faces the output side fixed sheave 62.

The output side oil chamber 65 is formed by a back surface 63a that is on the opposite side of the surface of the output side movable sheave 63, which faces the output side fixed sheave 62, and a disc-like output side partition 64 which is fixed to the secondary shaft 61. A ring-shaped protruding portion 63b, which protrudes toward the reduction gear unit 80, is formed on the back surface 63a of the output side movable sheave 63. Meanwhile, a ring-shaped protruding portion 64a, which protrudes toward the output side movable sheave 63, is formed on the output side partition 64. Sealing means, for example, an O-ring is provided between the protruding portion 63b and the protruding portion 64a. Namely, sealing is provided between the back surface 63a of the output side movable sheave 63 and the output side partition 64, the back surface 63a and the output side partition 64 forming the output side oil chamber 65.

As shown by an arrow B2, a hydraulic fluid is supplied to the output side oil chamber 65 from the hydraulic fluid supply control device through the oil supply port 22a, a communication hole 81b formed in an after-mentioned input shaft 81 of the reduction gear unit 80, the oil passage 106a, and the communication hole 61b. Namely, the hydraulic fluid is supplied to the output side oil chamber 65, and the output side movable sheave 63 is slid in the axial direction by the pressure of the hydraulic fluid supplied to the output side oil chamber 65, whereby the output side movable sheave 63 is moved so as to come closer to/move away from the output side fixed sheave 62. The output side movable sheave 63 generates a pressing force applied in the direction shown by an arrow C in FIG. 2 using the hydraulic fluid supplied to the output side oil chamber 65. Thus, the output side oil chamber 65 serves as belt holding force generating means for generating an output side belt holding force applied to the belt 100 which is provided between the output side movable sheave 63 and the output side fixed sheave 62 of the secondary pulley 60.

The damper oil chamber 70 that is a damper mechanism of the belt type continuously variable transmission 1-1 is provided between the secondary pulley 60 that is the output side pulley and the reduction gear unit 80 that is the planetary gear set. Namely, the damper oil chamber 70 is provided between the secondary shaft 61 that is the output side pulley shaft and the input shaft 81 of the reduction gear unit 80. The damper oil chamber 70 is formed by the protruding portion 61a of the secondary shaft 61, and an after-mentioned protruding portion 81a of the input shaft 81, which faces the protruding portion 61a at a predetermined distance. In this case, the predetermined distance is longer than a distance that the input shaft 81 can slide on the drive shaft 106 in the axial direction. Sealing means, for example, an O-ring 120, is provided between the protruding portion 61a and the protruding portion 81a. Namely, sealing is provided between the protruding portion 61a of the secondary shaft 61 and the protruding portion 81a of the input shaft 81, the protruding portion 61a and the protruding portion 81a forming the damper oil chamber 70.

As shown by an arrow B3, a hydraulic fluid is supplied from the hydraulic fluid supply control device to the damper oil chamber 70 through the oil supply port 22a, the communication hole 81b and the oil passage 106a. Namely, a part of the hydraulic fluid to be supplied to the output side oil chamber 65 is supplied to the damper oil chamber 70. Accordingly, it is not necessary to provide a new oil passage which supplies a hydraulic fluid from the hydraulic fluid supply control device to the damper oil chamber 70. It is therefore possible to suppress an increase in size of the belt type continuously variable transmission 1-1.

The reduction gear unit 80 that is the planetary gear set of the belt type continuously variable transmission 1-1 transmits the torque, which has been output from the internal combustion engine 10 and then transmitted to the reduction gear unit 90 via the secondary pulley 60, to the final reduction gear unit 90, thereby reducing the rotational speed transmitted from the secondary shaft 61. The reduction gear unit 80 includes the input shaft 81, a sun gear 82, pinions 83, and a ring gear 84. The reduction gear unit 80 is provided on the output side pulley shaft of the output side pulley, that is, the reduction gear unit 80 is provided on an axis A of the secondary shaft 61 of the secondary pulley 60. Namely, the reduction gear unit 80 is provided such that the gears 82 and 84, and a carrier 85 are arranged so as to be coaxial with the secondary shaft 61.

The input shaft 81 is a hollow shaft, and the drive shaft 106 is provided in a hollow portion (not shown) of the input shaft 81. The input shaft 81 is provided so as to be slidable on the drive shaft 106 in the axial direction. The protruding portion 81a, which protrudes outward in the radial direction of the input shaft 81, is formed on the input shaft 81 at an end portion on the secondary pulley 60 side. A spline 81c is formed in an inner surface of the end portion of the protruding portion 81a. The spline 81c and the spline 61c formed in the outer surface of the protruding portion 61a are in splined engagement. Namely, the input shaft 81 and the secondary shaft 61 are in splined engagement. The communication hole 81b, which permits communication between the oil supply port 22a formed in the transaxle case 22 and the oil passage 106a formed between the secondary shaft 61 and the drive shaft 106, is formed in the input shaft 81. Also, a parking brake 105 is provided for the protruding portion 81a.

The sun gear 82 is a helical gear, and is formed integrally with the input shaft 81 at an end portion which is on the opposite side of the end portion at which the protruding portion 81a is formed. Each of the pinions 83 is a helical gear, and meshed with the sun gear 82. Multiple (for example, three) pinions 83 are provided around the sun gear 82. The pinions 83 are supported by the carrier 85 and an after-mentioned differential case 91 of the final reduction gear unit 90 such that pinions 83 can revolve around the sun gear 82 along with the carrier 85 and the differential case 91. Namely, the carrier 85 and the differential case 91 rotate along with each other. The ring gear 84 is a helical gear. The ring gear 84 is meshed with the pinions 83 supported by the carrier 85 and the differential case 91, and fixed to the transaxle case 22.

The final reduction gear unit 90 that is the differential gear unit of the belt type continuously variable transmission 1-1 transmits the torque, which has been output from the internal combustion engine 10 and then transmitted to the final reduction gear unit 90 via the reduction gear unit 80, to wheels 108 and 109. As shown in FIGS. 1 and 2, the final reduction gear unit 90 transmits the torque, which has been output from the internal combustion engine 10 and then increased by the reduction gear unit 80, to the wheels 108 and 109. The final reduction gear unit 90 includes the differential case 91 in which a follow portion is formed, a pinion shaft 92, differential pinions 93 and 94, and side gears 95 and 96. The final reduction gear unit 90 is provided on the output side pulley shaft of the output side pulley, that is, on the axis A of the secondary shaft 61 of the secondary pulley 60. Namely, the final reduction gear unit 90 is provided such that the side gears 95 and 96 are provided coaxially with the secondary shaft 61.

The differential case 91 is rotatably supported by bearings 86 and 97 via the carrier 85 of the reduction gear unit 80. The pinion shaft 92 is provided in the hollow portion of the differential case 91. The differential pinions 93 and 94 are rotatably attached to the pinion shaft 92. The side gears 95 and 96 are meshed with the differential pinions 93 and 94. The side gears 95 and 96 are fixed to the drive shaft 106 and a drive shaft 107, respectively.

The drive shaft 106 is provided in the secondary shaft 61 and the input shaft 81 which are hollow shafts. The wheel 108 is attached to the drive shaft 106 at an end portion which is on the opposite side of the end portion to which the side gear 95 is fixed. Meanwhile, the wheel 109 is attached to the drive shaft 107 at an end portion which is on the opposite side of the end portion to which the side gear 96 is fixed.

The belt 100 of the belt type continuously variable transmission 1-1 transmits the torque, which has been output from the internal combustion engine 10 and then transmitted to the belt 100 via the primary pulley 50, to the secondary pulley 60. As shown in FIG. 1, the belt 100 is looped over the input side groove 100a of the primary pulley 50 and the output side groove 100b of the secondary pulley 60. The belt 100 is an endless belt formed of multiple metal pieces and multiple steel rings.

Figure 3:
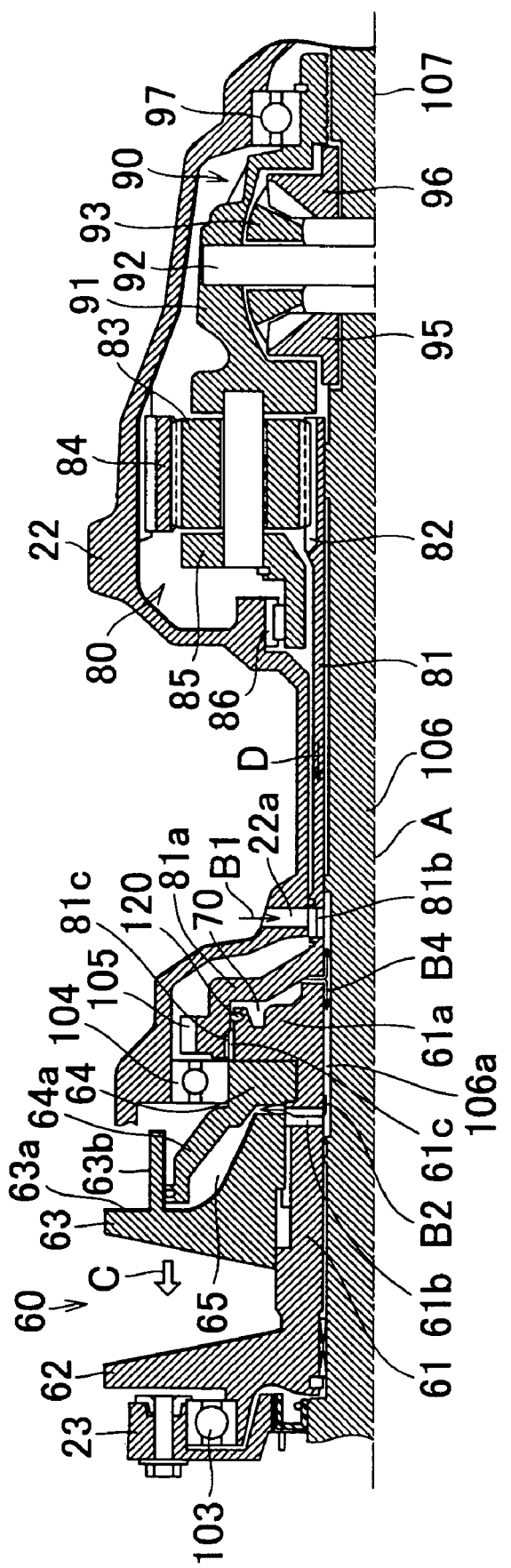
FIG. 3 is a view for describing an operation of the belt type continuously variable transmission according to the first embodiment.

Next, an operation of the belt type continuously variable transmission 1-1 according to the first embodiment will be described. FIG. 3 is a view for describing the operation of the belt type continuously variable transmission 1-1 according to the first embodiment. When a driver selects a forward position using a shift position device (not shown) provided in the vehicle, an ECU (i.e., Electronic Control Unit) (not shown) engages the forward clutch 42 using the hydraulic fluid supplied from the hydraulic fluid supply control device and releases the reverse brake 43, thereby controlling the forward/reverse changing mechanism 40. Thus, the input shaft 38 and the primary shaft 51 are directly connected with each other. Namely, the sun gear 44 and the ring gear 46 of the planetary gear set 41 are directly connected with each other, the primary shaft 51 is rotated in the same direction as the rotational direction of the crankshaft 11 of the internal combustion engine 10, and the torque output from the internal combustion engine 10 is transmitted to the primary pulley 50. The torque, which has been output from the internal combustion engine 10 and then transmitted to the primary pulley 50, is transmitted to the secondary pulley 60 via the belt 100, and rotates the secondary shaft 61 of the secondary pulley 60.

The torque, which has been output from the internal combustion engine 10 and then transmitted to the secondary pulley 60, is transmitted from the secondary shaft 61 to the input shaft 81 of the reduction gear unit 80, and rotates the input shaft 81. In accordance with the rotation of the input shaft 81, the sun gear 82 rotates in the same direction as the rotational direction of the input shaft 81. Each of the pinions 83, which are meshed with the sun gear 82 and the ring gear 84, revolves around the sun gear 82 while rotating on its axis. Since the pinions 83 revolve around the sun gear 82, the carrier 85 and the differential case 91 of the final reduction gear unit 90, which support the pinions 83, are rotated in the same direction as the rotational direction of the sun gear 82, and then the torque, which has been output from the internal combustion engine 10 and then transmitted to the secondary pulley 60, is transmitted to the final reduction gear unit 90. The torque, which has been output from the internal combustion engine 10 and then transmitted to the differential case 91, is transmitted the drive shafts 106 and 107 via the differential pinions 93 and 94 and the side gears 95 and 96, is transmitted to the wheels 108 and 109 attached to the end portions of the drive shafts 106 and 107, respectively, and rotates the wheels 108 and 109 attached to the end portions, whereby the vehicle runs forward.

On the other hand, when the driver selects the reverse position using the shift position device (not shown) provided in the vehicle, the ECU (not shown) disengages the forward clutch 42 using the hydraulic fluid supplied from the hydraulic fluid supply control device, and applies the reverse brake 43, thereby controlling the forward/reverse changing mechanism 40. Thus, the carrier 47 of the planetary gear set 41 is fixed to the transaxle case 22, and each of the pinions is supported by the carrier 47 so as only to rotate on its axis. Accordingly, the ring gear 46 rotates in the same direction as the rotational direction of the input shaft 38, each of the pinions 45 meshed with the ring gear 46 rotates in the same direction as the rotational direction of the input shaft 38, and the sun gear 44 meshed with the pinions 45 rotates in the direction opposite to the rotational direction of the input shaft 38. Namely, the primary shaft 51 coupled with the sun gear 44 rotates in the direction opposite to the rotational direction of the input shaft 38. Thus, the secondary shaft 61 of the secondary pulley 60, the input shaft 81, the differential case 91, and the drive shafts 106 and 107 rotate in the direction opposite to the rotational direction thereof when the driver selects s forward position, whereby the vehicle runs in reverse.

The ECU (not shown) controls the speed ratio of the belt type continuously variable transmission 1-1 based on various values such as a vehicle speed and an accelerator pedal operation amount obtained by the driver and a map stored in a storing portion of the ECU (for example, the optimum fuel efficiency curve based on an engine rotational speed and a throttle valve opening amount) such that the optimum operational state of the internal combustion engine 10 is realized. The speed ratio of the belt type continuously variable transmission 1-1 is controlled by controlling the hydraulic pressure of the hydraulic fluid supplied from the hydraulic fluid supply control device to the input side oil chamber 55 that is the speed ratio control means of the primary pulley 50. Namely, the input side movable sheave 53 moves on the primary shaft 51 in the axial direction, whereby the distance between the input side fixed sheave 52 and the input side movable shave 53, that is, the width of the input side groove 100a is adjusted. Thus, the radius of the portion of the primary pulley 50, which contacts the belt 100, is changed, whereby the speed ratio, that is, the ratio of the rotational speed of the primary pulley 50 to the rotational speed of the secondary pulley 60 is continuously controlled.

Meanwhile, in the secondary pulley 60, the belt holding force for holding the belt using the output side fixed sheave 62 and the output side movable sheave 63 is adjusted by controlling the hydraulic pressure of the hydraulic fluid supplied from the hydraulic fluid supply control device to the output side oil chamber 65 that is the belt holding force generating means. Thus, a tensile force of the belt 100 looped over the primary pulley 50 and the secondary pulley 60 is controlled.

In the reduction gear unit 80 that is the planetary gear set, each of the sun gear 82, the pinions 83, and the ring gear is a helical gear. Therefore, when the torque output from the internal combustion engine 10 is transmitted to the reduction gear unit 80 via the secondary shaft 61 of the secondary pulley 60, a thrust force is generated in each of these gears.

When the torque output from the internal combustion engine 10 changes, especially, when the torque output from the internal combustion engine 10 abruptly changes, the thrust force transmitted to the input shaft 81 changes. When the thrust force instantaneously increases, the thrust force is instantaneously transmitted from the sun gear 82 to the input shaft 81, for example, as shown by an arrow D in FIG. 3. The thrust force is instantaneously transmitted to the hydraulic fluid in the damper oil chamber 70 that is the damper means via the protruding portion 81a of the input shaft 81.

At this time, if the force applied in the axial direction by the pressure of the hydraulic fluid in the damper oil chamber 70 is smaller than the thrust force instantaneously transmitted via the protruding portion 81a, a part of the hydraulic fluid in the damper oil chamber 70 returns to the oil passage 106a through a portion between the protruding portion 61a of the secondary shaft 61 and the protruding portion 81a of the input shaft 81, as shown by an arrow B4 in FIG. 3. Thus, the volume of the damper oil chamber 70 changes according to the amount of thrust force transmitted to the hydraulic fluid. Namely, the input shaft 81 slides on the drive shaft 106 in the direction shown by the arrow D according to the amount of thrust force transmitted to the hydraulic fluid, whereby the thrust force transmitted to the hydraulic fluid is absorbed. Since the thrust force transmitted to the hydraulic fluid is absorbed by the damper oil chamber 70, the thrust force transmitted to the protruding portion 61a of the secondary shaft 61 is reduced. Namely, when the thrust force generated in the reduction gear unit 80, that is, the thrust force transmitted to the input shaft 81 is transmitted to the secondary shaft 61 of the secondary pulley 60, the thrust force is absorbed by being transmitted to the hydraulic fluid in the damper oil chamber 70 that is the damper means, whereby the thrust force transmitted to the secondary shaft 61, that is, the thrust force transmitted to the secondary pulley 60 is reduced.

Thus, even when the thrust force transmitted to the input shaft 81 changes abruptly due to a change in the torque output from the internal combustion engine 10, especially, due to an abrupt change in the torque output from the internal combustion engine 10, the thrust force transmitted to the secondary shaft 61 can be reduced. It is therefore possible to suppress an abrupt positional displacement of the secondary shaft 61 with respect to the primary shaft 51 in the axial direction. Accordingly, even when the thrust force abruptly increases due to a change in the torque output from the internal combustion engine 10, the thrust force transmitted to the secondary shaft 61 is reduced. It is, therefore, possible to suppress a displacement of the relative position between the primary pulley 50 and the secondary pulley 60 in the axial direction. It is thus possible to prevent a situation in which the torque output from the internal combustion engine 10 is transmitted from the primary pulley 50 to the secondary pulley 60 via the belt 100 with the belt 100 being displaced, that is, with the belt 100 being instantaneously inclined with respect to the axial direction. As a result, it is possible to suppress occurrence of adverse effects such as a decrease in the durability.

When the thrust force is instantaneously decreased, the hydraulic fluid in the oil passage 106a is supplied from the portion between the protruding portion 61a of the secondary shaft 61 and the protruding portion 81a of the input shaft 81 to the damper oil chamber 70, as shown by the arrow B3 in FIG. 2. Thus, the volume of the damper oil chamber 70 is changed according to the amount of thrust force transmitted to the hydraulic fluid, that is, the input shaft 81 slides on the drive shaft 106 in the direction opposite to the direction shown by the arrow D according to the amount of thrust force transmitted to the hydraulic fluid. Accordingly, the position of the secondary shaft 61 in the axial direction does not change, or hardly changes. It is therefore possible to suppress a displacement of the relative position between the primary pulley 50 and the secondary pulley 60 in the axial direction.

Also, when the thrust force instantaneously increases, a part of the hydraulic fluid in the damper oil chamber 70 returns to the oil passage 106*a*, as shown by an arrow B4 in FIG. 3. The hydraulic fluid returned to the oil passage 106*a* is supplied to the output side oil chamber 65 through the communication hole 61*b* of the secondary pulley 60, as shown by the arrow B2 in FIG. 3. Accordingly, the pressing force applied in the direction shown by the arrow C in FIG. 3 increases, and the output side movable sheave 63 of the secondary pulley 60 can increase the output side belt holding force of the secondary pulley 60 when the torque output from the internal combustion engine 10 increases.

The hydraulic fluid having the same pressure as the pressure in the output side oil chamber 65 is supplied to the damper oil chamber 70 that is the damper means. Accordingly, the secondary shaft 61 is pressed to the transaxle rear cover 23 side, and the input shaft 81 of the reduction gear unit 80 is pressed to the final reduction gear unit 90 side. It is therefore possible to suppress shakiness of the secondary shaft 61 in the axial direction.

Figure 4:
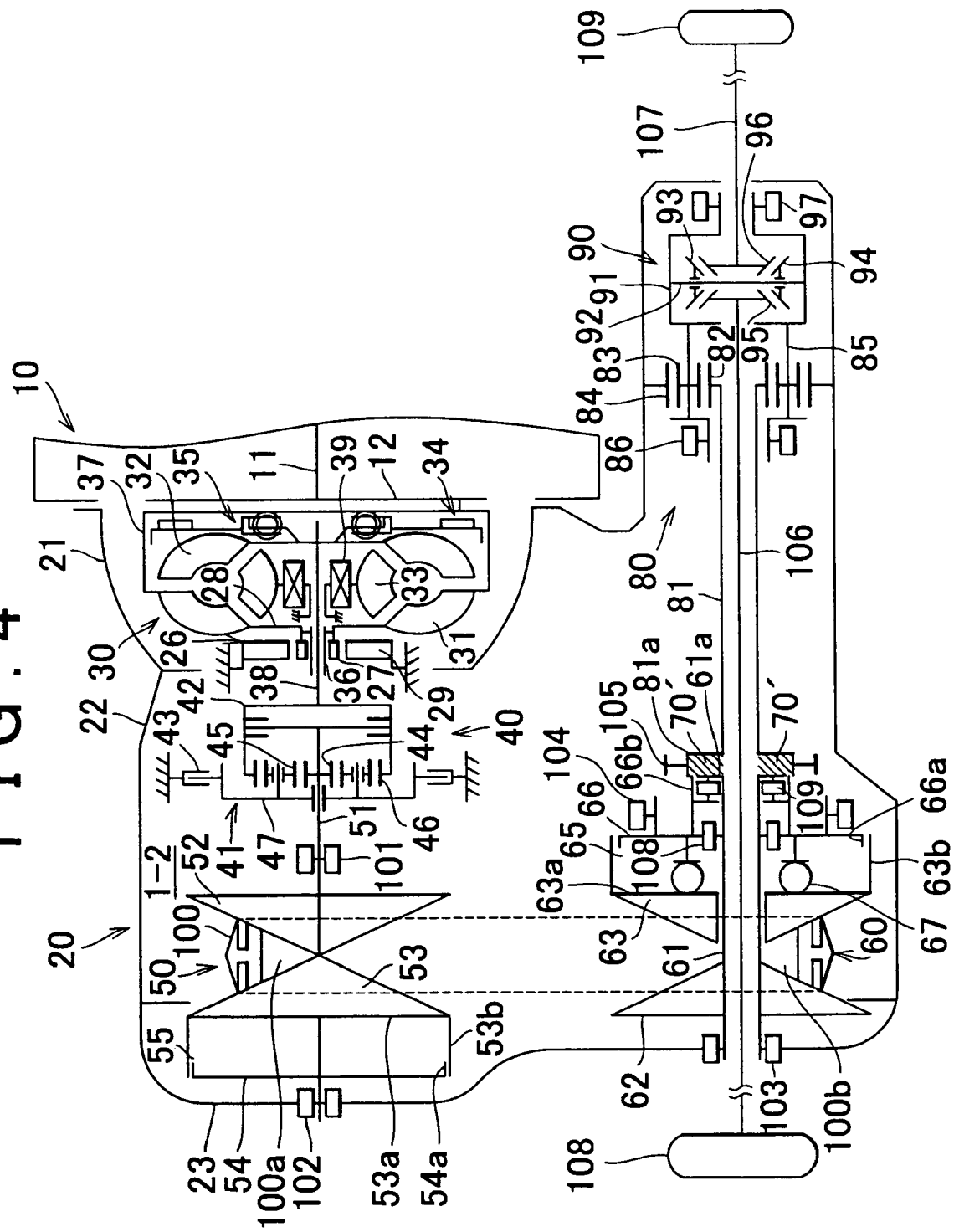
FIG. 4 is a skeleton diagram showing a belt type continuously variable transmission according to a second embodiment of the invention.
Figure 5:
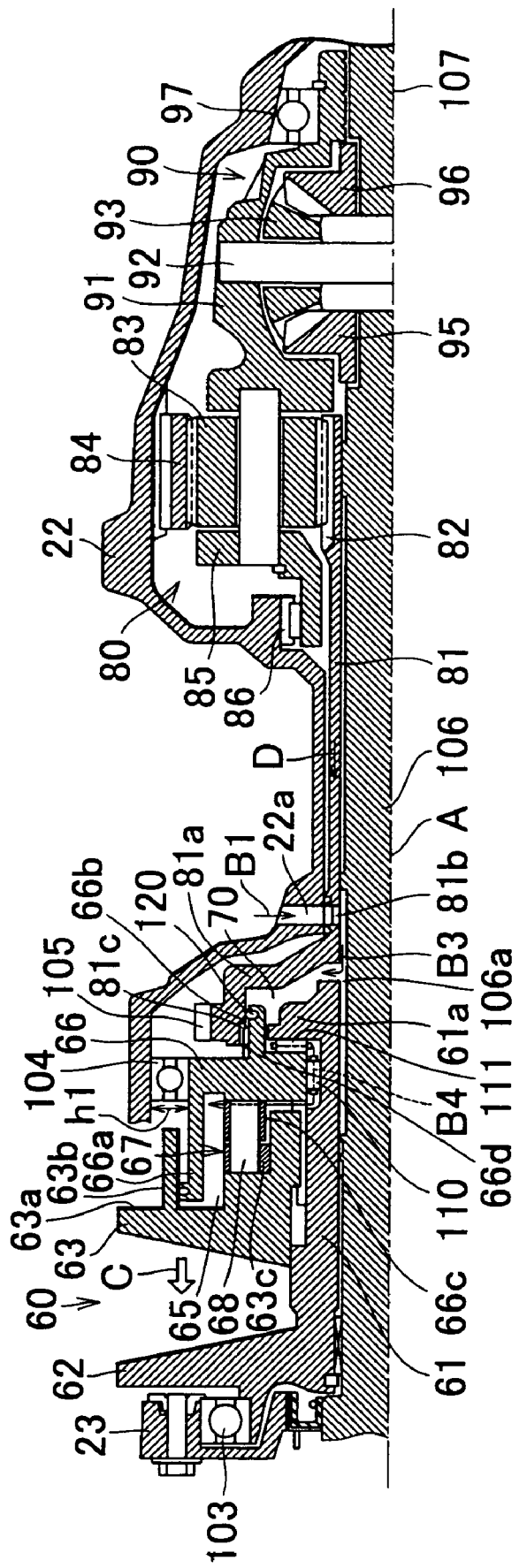
FIG. 5 is a cross sectional view showing a main portion of the belt type continuously variable transmission according to the second embodiment.
Figure 7A:
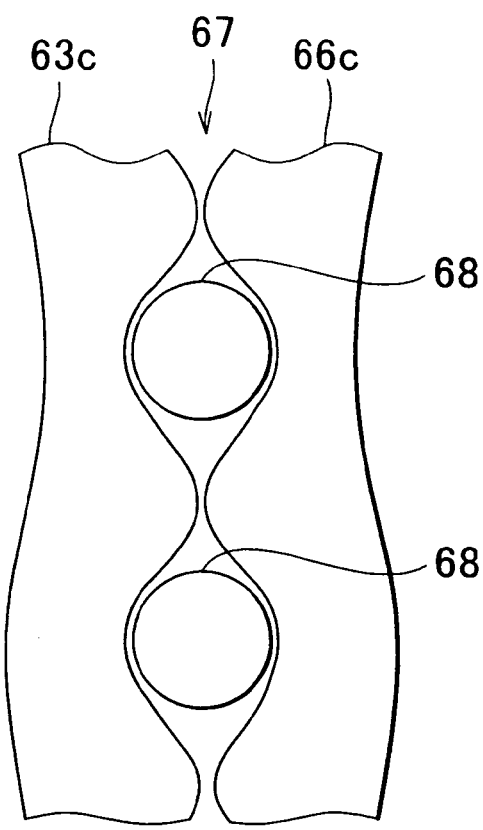
FIG. 7A is a view showing an example of a structure of a torque cam.
Figure 7B:
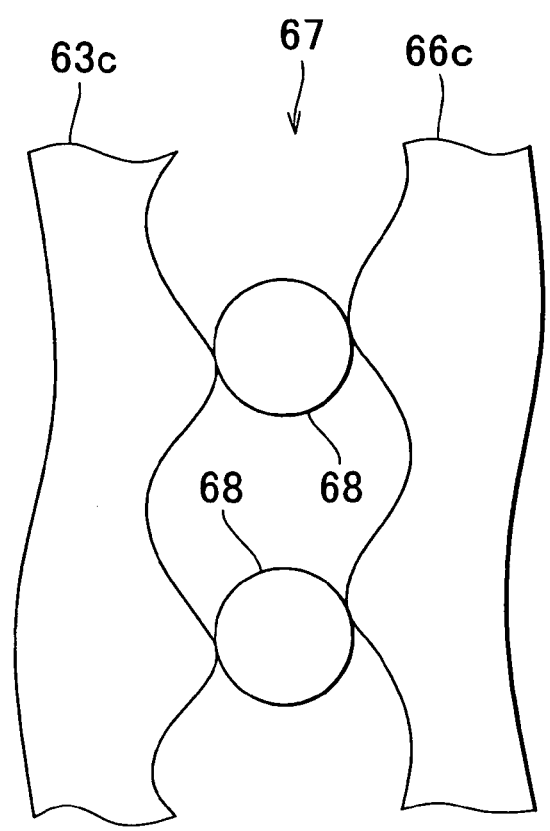
FIG. 7B is a view for describing an operation of the torque cam.

Next, a second embodiment of the invention will be described. FIG. 4 is a skeleton diagram showing a belt type continuously variable transmission according to the second embodiment of the invention. FIG. 5 is a view showing a main portion of the belt type continuously variable transmission according to the second embodiment. FIG. 6 is a view showing an operation of the belt type continuously variable transmission according to the second embodiment. FIG. 7A is a view showing an example of a structure of a torque cam. FIG. 7B is a view showing an operation of the torque cam. The belt type continuously variable transmission 1-2 shown in FIG. 4 is different from the belt type continuously variable transmission 1-1 shown in FIG. 1 in that the torque, which has been output from the internal combustion engine 10 and then transmitted to the secondary pulley 60, is transmitted to the input shaft of the reduction gear unit 80 via an intermediate member 66 without using the secondary shaft 61. The basic structure of the belt type continuously variable transmission 1-2 shown in FIG. 4 is the same as the basic structure of the belt type continuously variable transmission 1-1 shown in FIG. 1. Accordingly, the description of the basic structure is not made here.

As shown in FIGS. 4 and 5, the secondary pulley 60 includes a torque cam 67 in addition to the output side oil chamber 65, as the belt holding force generating means. The torque cam 67 mainly generates the output side belt holding force, and the output side oil chamber 65 generate belt holding force equivalent to the shortage caused by the output side belt holding force generated by the torque cam 67.

As shown in FIGS. 5 and 7A, the torque cam 67 includes a ring-shaped and wave-form first engagement portion 63*c* provided on the output side movable sheave 63 of the secondary pulley 60; a second engagement portion 66*c* which is formed on the intermediate member 66 and which faces the first engagement member 63*c* in the axial direction of the secondary shaft 61; and disc-like transmission members 68 which are provided between the first engagement portion 63*c* and the second engagement portion 66*c*.

The intermediate member 66 is supported by a bearing 110 fixed in the axial direction of the secondary shaft 61 and a bearing 111 which is fixed in the radial direction of the secondary shaft 61 such that the intermediate member 66 is rotatable on the secondary shaft 61 with respect to the secondary shaft 61 and the output side movable sheave 63. The intermediate member 66 and the input shaft 81 of the reduction gear unit 80 are in splined engagement. Namely, the torque, which has been output from the internal combustion engine 10 and then transmitted to the secondary pulley 60, is transmitted to the reduction gear unit 80 via the intermediate member 66.

The intermediate member 66 has a function as the output side partition constituting the output side oil chamber 65. Namely, the output side oil chamber 65 in the belt type continuously variable transmission 1-2 according to the second embodiment is formed by the back surface 63*a* of the output side movable sheave 63, and the intermediate member 66. A ring-shaped protruding portion 66*a* which protrudes toward the output side movable sheave 63 is formed on the intermediate member 66. Sealing means, for example, an O-ring is provided between the protruding portion 66*a* and the protruding portion 63*b* of the back surface 63*a*. Namely, sealing is provided between the back surface 63*a* of the output side movable sheave 63 and the intermediate member 66, which constitute the output side oil chamber 65.

The hydraulic fluid is supplied from the hydraulic fluid supply control device to the output side oil chamber 65 through a damper oil passage. Namely, as shown by an arrow B3 in FIG. 5, the hydraulic fluid, which has flowed into the hydraulic passage 106*a*, is supplied to the damper oil chamber 70 from a portion between the protruding portion 61*a* of the secondary shaft 61 and the protruding portion 81*a* of the input shaft 81. The hydraulic fluid supplied to the damper oil chamber 70 is supplied to the output side oil chamber 65 from a portion between the secondary shaft 61 and the intermediate member 66, as shown by an arrow B4. The pressing force applied in the direction shown by an arrow C is generated by the pressure of the hydraulic fluid supplied to the output side oil chamber 65, whereby the belt holding force applied to the belt 100, which is provided between the output side movable shave 63 and the output side fixed sheave 62 of the secondary pulley 60, is generated.

Also, the intermediate member 66 constitutes a part of the damper oil chamber 70 that is the damper means. Namely, the damper oil chamber 70 is formed by the protruding portion 61*a* of the secondary shaft 61, the protruding portion 81*a* of the input shaft 81, and the intermediate member 66. A ring-shaped protruding portion 66*b* which protrudes toward the reduction gear unit 80 side is formed on the intermediate member 66. Sealing means, for example, the O-ring 120 is provided between the protruding portion 66*b* and the protruding portion 81*a* of the input shaft 81.

Next, an operation of a torque cam 67 will be described. When the torque output from the internal combustion engine 10 is transmitted to the primary pulley 50, and the primary pulley 50 rotates, the secondary pulley 60 rotates in accordance with the primary pulley 50 via the belt 100. At this time, the output side movable sheave 63 of the secondary pulley 60 rotates along with the output side fixed sheave 62, the secondary shaft 61 and the bearing 110. Therefore, the output side movable sheave 63 and the intermediate member 66 rotate with respect to each other. Then the state of the torque cam 67 is changed by the transmission members 68 from a state shown in FIG. 7A, in which the first engagement portion 63*c* and the second engagement portion 66*c* are close to each other, to a state shown in FIG. 7B, in which the first engagement portion 63*c* and the second engagement portion 66c are apart from each other. Thus, the torque cam 67 generates a belt holding force applied to the belt 100 in the secondary pulley 60.

Next, an operation of the belt type continuously variable transmission 1-2 according to the second embodiment will be described. The basic operation of the belt type continuously variable transmission 1-2 shown in FIG. 4 is the same as the basic operation of the belt type continuously variable transmission 1-1 shown in FIG. 1. Therefore, the description of the basic operation will not be made here.

When the thrust force generated in the reduction gear unit 80 that is the planetary gear set instantaneously increases, the thrust force is instantaneously transmitted from the sun gear 82 to the input shaft 81, and then instantaneously transmitted to the hydraulic fluid in the damper oil chamber 70 that is the damper means via the protruding portion 81a of the input shaft 81, for example, as shown by an arrow D in FIG. 5. At this time, if the pressure of the hydraulic fluid in the damper oil chamber 70 is smaller than the thrust force instantaneously transmitted to the hydraulic fluid in the damper oil chamber 70 via the protruding portion 81a, a part of the hydraulic fluid in the damper oil chamber 70 returns to the oil passage 106a from the portion between the protruding portion 61a of the secondary shaft 61 and the protruding portion 81a of the input shaft 81, as shown by an arrow B5 in FIG. 6. Thus, the volume of the damper oil chamber 70 changes according to the amount of thrust force transmitted to the hydraulic fluid, that is, the input shaft 81 slides on the drive shaft 106 in the direction shown by the arrow D according to the amount of thrust force transmitted to the hydraulic fluid, whereby the thrust force transmitted to the hydraulic fluid is absorbed.

Since the thrust force transmitted to the hydraulic fluid is absorbed by the damper oil chamber 70, the thrust force transmitted to the protruding portion 61a of the secondary shaft 61 and the intermediate member 66 is reduced. Namely, when the thrust force generated in the reduction gear unit 80, that is, the thrust force transmitted to the input shaft 81 is transmitted to the secondary shaft 61 of the secondary pulley 60 and the intermediate member 66, the thrust force is absorbed by being transmitted to the hydraulic fluid in the damper oil chamber 70 that is the damper means. Accordingly, the thrust force transmitted to the secondary shaft 61 and the intermediate member 66, that is, the thrust force transmitted to the secondary pulley 60 is reduced.

Therefore, even if the thrust force transmitted to the input shaft 81 abruptly changes due to an abrupt change in the torque output from the internal combustion engine 10, the thrust force transmitted to the secondary shaft 61 and the intermediate member 66 can be reduced. As a result, it is possible to suppress an abrupt positional displacement of the secondary shaft 61 with respect to the primary shaft 51 in the axial direction of the secondary shaft 61. Accordingly, even when the thrust force abruptly increases due to a change in the torque output from the internal combustion engine 10, the thrust force transmitted to the secondary shaft 61 and the intermediate member 66 can be reduced. As a result, it is possible to suppress a displacement of the relative position between the primary pulley 50 and the secondary pulley 60 in the axial direction. Thus, it is possible to prevent a situation in which the torque output from the internal combustion engine 10 is transmitted from the primary pulley 50 to the secondary pulley 60 via the belt 100 with the belt 100 being displaced, that is, with the belt 100 being instantaneously inclined with respect to the axial direction. As a result, it is possible to suppress occurrence of adverse effects such as a decrease in the durability.

Also, the bearings 110 and 111, which support the intermediate member 66 such that the intermediate member 66 is rotatable on the secondary shaft 61 with respect to the secondary shaft 61 and the output side movable sheave 63, are lubricated when the hydraulic fluid supplied to the damper oil chamber 70 is supplied to the output side oil chamber 65. Accordingly, it is not necessary to provide a new oil passage for lubricating the bearings 110 and 111. As a result, it is possible to suppress an increase in size of the belt type continuously variable transmission 1-2. It is also possible to realize the belt type continuously variable transmission 1-2 having a simple configuration.

The damper oil chamber 70 that is the damper means according to the second embodiment has not only a space portion formed between the protruding portion 61a of the secondary shaft 61 and the protruding portion 81a of the input shaft 81 but also a space portion formed between the protruding portion 61a of the secondary shaft 61 and the intermediate member 66. Namely, since the maximum volume of the damper oil chamber 70 is large, the thrust force transmitted to the hydraulic fluid can be further absorbed, and therefore the thrust force transmitted to the secondary shaft 61 and the intermediate member 66 can be further reduced. As a result, it is possible to further suppress the displacement of the relative position between the primary pulley 50 and the secondary pulley 60 in the axial direction.

As described above, the maximum volume of the damper oil chamber 70 that is the damper means according to the second embodiment is large, and therefore the thrust force transmitted to the hydraulic fluid can be further absorbed. Accordingly, a helical gear having a small diameter can be used for each gear of the reduction gear unit 80. By using the helical gear having a small diameter, the thrust force generated when the toque output from the internal combustion engine 10 is transmitted is increased. As a result, it is possible to reduce the size of the reduction gear unit 80 in the radial direction. It is therefore possible to further suppress an increase in size of the belt type continuously variable transmission 1-2.

Figure 8:
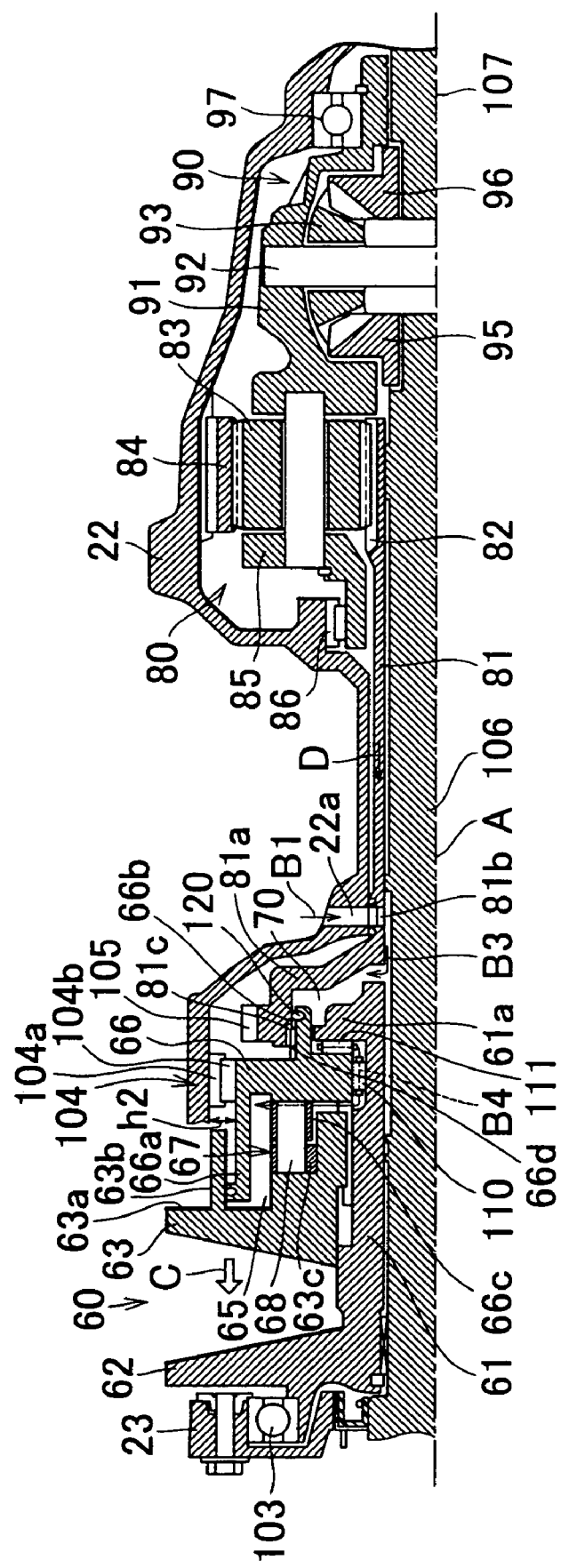
FIG. 8 is another cross sectional view showing the main portion of the belt type continuously variable transmission according to the second embodiment.

FIG. 8 is another cross sectional view showing the main portion of the belt type continuously variable transmission according to the second embodiment. In the belt type continuously variable transmission 1-2 shown in FIG. 5, the bearing 104 which is one of the bearings that rotatably support the secondary shaft 61, that is, the bearing 104 which is engaged on the outside of the intermediate member 66 in the radial direction includes an outer race, a rolling element, and an inner race. As shown in FIG. 8, the bearing 104 may include an outer race 104a, a rolling element 104b and the intermediate member 66. Namely, the intermediate member 66 may be used as the inner race of the bearing 104, and an inner race side rolling portion may be formed by the rolling element 104b and the outer surface of the intermediate member 66. Thus, a radial direction width h2 of the bearing 104, which is one of the bearings that rotatably support the secondary shaft 61 shown in FIG. 8, becomes smaller than a radial direction width h1 of the bearing 104, which is one of the bearings that rotatably support the secondary shaft 61 shown in FIG. 5. As a result, it is possible to suppress an increase in size of the belt type continuously variable transmission 1-2.

In the first and second embodiments, the input side oil chamber 55 is used as the input side belt holding force generating means and the output side oil chamber 65 and the torque cam 67 are used as the output side belt holding force generating means. However, the input side belt holding force generating means and the output side belt holding force generating means are not limited to these. For example, an electric motor may be used by itself as the belt holding force generating means. Alternatively, an electric motor may be used along with the belt holding force generating means in the embodiments.

Also, in the first and second embodiments, the damper oil chamber 70 whose volume changes as the input shaft 81 of the reduction gear unit 80 slides is used as the damper means. However, the damper means is not limited to the damper oil chamber 70. For example, an elastic body such as a spring, rubber, a polyurethane elastomer may be provided between the secondary shaft 61 and the input shaft 81, that is, between the secondary pulley 60 and the reduction gear unit 80, as the damper means.

As described above, the belt type continuously variable transmission according to the invention is suitable as the belt type continuously variable transmission in which the planetary gear set is provided so as to be coaxial with the output side pulley shaft of the output side pulley. Particularly, the belt type continuously variable transmission according to the invention is suitable for suppressing the displacement of the relative position between the input shaft side pulley and the output side pulley in the axial direction.

While the invention has been described with reference to exemplary embodiments thereof, it is to be understood that the invention is not limited to the exemplary embodiments or constructions. To the contrary, the invention is intended to cover various modifications and equivalent arrangements. In addition, while the various elements of the exemplary embodiments are shown in various combinations and configurations, which are exemplary, other combinations and configurations, including more, less or only a single element, are also within the spirit and scope of the invention.

What is claimed is:

1. A belt type continuously variable transmission, comprising:
    an input side pulley which includes an input side pulley shaft to which a driving force from a drive source is transmitted, an input side movable sheave that slides on the input side pulley shaft in an axial direction of the input side pulley shaft, and an input side fixed sheave that faces the input side movable sheave in the axial direction such that an input side groove is formed between the input side fixed sheave and the input side movable sheave;
    an output side pulley which includes an output side pulley shaft that is provided in parallel with the input side pulley shaft, an output side movable sheave that slides on the output side pulley shaft in an axial direction of the output side pulley shaft, and an output side fixed sheave that faces the output side movable sheave in the axial direction such that an output side groove is formed between the output side fixed sheave and the output side movable sheave;
    a belt which is looped over the input side groove and the output side groove;
    a planetary gear set which transmits the driving force transmitted from the output side pulley to a differential gear unit that is provided so as to be coaxial with the output side pulley shaft; and
    a damper device which is provided between the output side pulley and the planetary gear set,
    wherein the planetary gear set includes an input shaft to which the driving force transmitted from the output side pulley is transmitted, and which is slidable on an axis of the output side pulley shaft in the axial direction of the output side pulley shaft, and the damper device is provided between the output side pulley shaft and the input shaft, and wherein the damper device is a damper oil chamber whose volume changes as the input shaft slides on the axis of the output side pulley shaft in the axial direction of the output side pulley shaft.

2. The belt type continuously variable transmission according to claim 1, wherein
    the damper device is provided between the output side pulley shaft and the input shaft, and an intermediate member forms a part of the damper device.

3. The belt type continuously variable transmission according to claim 1, wherein
    the planetary gear set is formed of multiple helical gears meshed with each other.

4. The belt type continuously variable transmission according to claim 1, wherein
    the damper oil chamber is a space formed by a protruding portion that is formed at an end portion of the output side pulley shaft and that protrudes outward in a radial direction of the output side pulley shaft, and a protruding portion that is formed at an end portion of the input shaft to which the driving force from the damper device is transmitted and that protrudes outward in a radial direction of the input shaft.

5. The belt type continuously variable transmission according to claim 4, wherein
    the input shaft is a hollow shaft, a sun gear is formed on the input shaft at an end portion on a side of the planetary gear set, and the sun gear is meshed with pinions of the planetary gear set.

6. The belt type continuously variable transmission according to claim 4, wherein
    a hydraulic fluid pressure supplied, through the output side pulley shaft, to an output side oil chamber that is formed by a back surface of the output side movable sheave, which is on an opposite side of another surface of the output side movable sheave, the other surface facing the output side fixed sheave, and an output side partition fixed to the output side pulley shaft is equal to a hydraulic fluid pressure supplied to the damper oil chamber through the output side pulley shaft.

7. The belt type continuously variable transmission according to claim 4, wherein
    a spline portion is formed in each of the protruding portion of the output side pulley shaft and the protruding portion of the input shaft, and the protruding portions are in splined engagement, whereby the output side pulley shaft and the input shaft are slidable with respect to each other in the axial direction.

8. The belt type continuously variable transmission according to claim 7, wherein
    sealing means is provided at a slide portion at which the protruding portion of the output side pulley shaft and the protruding portion of the input shaft slide with respect to each other.

9. The belt type continuously variable transmission according to claim 1, wherein
    the damper oil chamber is formed by a protruding portion that is formed at an end portion of the output side pulley shaft and that protrudes outward in a radial direction of the output side pulley shaft, a protruding portion that is formed at an end portion of the input shaft and that protrudes outward in a radial direction of the input shaft, and the intermediate member.

10. The belt type continuously variable transmission according to claim 9, wherein the input shaft is a hollow shaft, a sun gear is formed on the input shaft at an end portion on a side of the planetary gear set, and the sun gear is meshed with pinions of the planetary gear set.

11. The belt type continuously variable transmission according to claim 9, wherein
a hydraulic fluid pressure is supplied, through the damper oil chamber, to an output side oil chamber that is formed by a back surface of the output side movable sheave, which is on an opposite side of another surface of the output side movable sheave, the other surface facing the output side fixed sheave, and a surface of the intermediate member, which faces the output side movable sheave.

12. The belt type continuously variable transmission according to claim 9, wherein
a spline portion is formed in each of a protruding portion of the intermediate member and the protruding portion of the input shaft, and the protruding portions are in splined engagement, whereby the intermediate member and the input shaft are slidable with respect to each other in the axial direction.

13. The belt type continuously variable transmission according to claim 12, wherein
sealing means is provided at a slide portion at which the protruding portion of the intermediate member and the protruding portion of the input shaft slide with respect to each other.

14. The belt type continuously variable transmission according to claim 1, wherein
the planetary gear set includes a sun gear, pinions meshed with the sun gear, a carrier which rotatably supports the pinions, and a ring gear which is fixed to a case; the sun gear is formed at an end portion of an input shaft that is a hollow shaft to which a driving force from the damper device is transmitted; the carrier is formed integrally with a differential case of the differential gear unit; and one of two output shafts of the differential gear unit penetrates an axis of the hollow input shaft.

15. The belt type continuously variable transmission according to claim 14, wherein
the input side pulley shaft is coupled with a forward/reverse changing mechanism which changes a direction of rotation input in the belt type continuously variable transmission between a normal rotational direction and a reverse rotational direction, and the forward/reverse changing mechanism is coupled with a torque converter.

16. The belt type continuously variable transmission according to claim 15, wherein
the driving force from the drive source is transmitted to the differential gear unit via the toque converter, the forward/reverse changing mechanism, the input side pulley and the output side pulley of the belt type continuously variable transmission, and the planetary gear set.

17. A belt type continuously variable transmission, comprising:
an input side pulley which includes an input side pulley shaft to which a driving force from a drive source is transmitted, an input side movable sheave that slides on the input side pulley shaft in an axial direction of the input side pulley shaft, and an input side fixed sheave that faces the input side movable sheave in the axial direction such that an input side groove is formed between the input side fixed sheave and the input side movable sheave;
an output side pulley which includes an output side pulley shaft that is provided in parallel with the input side pulley shaft, an output side movable sheave that slides on the output side pulley shaft in an axial direction of the output side pulley shaft, and an output side fixed sheave that faces the output side movable sheave in the axial direction such that an output side groove is formed between the output side fixed sheave and the output side movable sheave;
a belt which is looped over the input side groove and the output side groove;
a planetary gear set which transmits the driving force transmitted from the output side pulley to a differential gear unit that is provided so as to be coaxial with the output side pulley shaft; and
damper means provided between the output side pulley and the planetary gear set,
wherein the planetary gear set includes an input shaft to which the driving force transmitted from the output side pulley is transmitted, and which is slidable on an axis of the output side pulley shaft in the axial direction of the output side pulley shaft, and the damper means is provided between the output side pulley shaft and the input shaft, and wherein the damper means is a damper oil chamber whose volume changes as the input shaft slides on the axis of the output side pulley shaft in the axial direction of the output side pulley shaft.

* * * * *